United States Patent [19]

Davis et al.

[11] 4,075,910
[45] Feb. 28, 1978

[54] OVERLOAD SAFETY DEVICE FOR GAS TURBINE ENGINES

[75] Inventors: Warren W. Davis, Dunlap; Leroy R. Thompson, Peoria, both of Ill.

[73] Assignee: Caterpillar Tractor Co., Peoria, Ill.

[21] Appl. No.: 716,044

[22] Filed: Aug. 20, 1976

[51] Int. Cl.² .................. F16H 57/10; F16D 7/02; B60T 13/04
[52] U.S. Cl. .................. 74/785; 188/166; 64/30 C
[58] Field of Search .......... 74/785, 789, 781 R; 64/30 R, 30 C; 188/83, 166, 72.9; 81/52.4 R, 52.4 A, 52.4 B

[56] References Cited

U.S. PATENT DOCUMENTS

| 680,825 | 8/1901 | Westinghouse | 74/785 |
|---|---|---|---|
| 1,815,345 | 7/1931 | Colman | 74/785 X |
| 2,103,149 | 12/1937 | Cutler | 188/72.9 |
| 2,195,398 | 4/1940 | Duda | 64/30 C |
| 3,115,791 | 12/1963 | Dean | 74/785 X |
| 3,521,505 | 7/1970 | Sebring | 74/785 |
| 3,837,438 | 9/1974 | Hollnagle | 188/72.9 X |

FOREIGN PATENT DOCUMENTS

| 2,318,760 | 10/1973 | Germany | 74/785 |
|---|---|---|---|
| 304,127 | 1971 | U.S.S.R. | 81/52.4 A |

Primary Examiner—Samuel Scott
Assistant Examiner—Lance W. Chandler
Attorney, Agent, or Firm—Phillips, Moore, Weissenberger, Lempio & Majestic

[57] ABSTRACT

An overload safety device in an output gear box of a high speed turbine engine protects the output gears and shaft system of the turbine against damage due to instantaneous high loads imposed on the turbine as, for example, high loads due to out-of-phase paralleling of a generator. The device comprises interleaved friction discs normally compressed together under a predetermined load by a plurality of spring-biased clamping bars. When the torque load on the friction discs exceeds a predetermined amount, the discs will separate axially against the clamping bars whereby the torque overload is alleviated.

16 Claims, 2 Drawing Figures

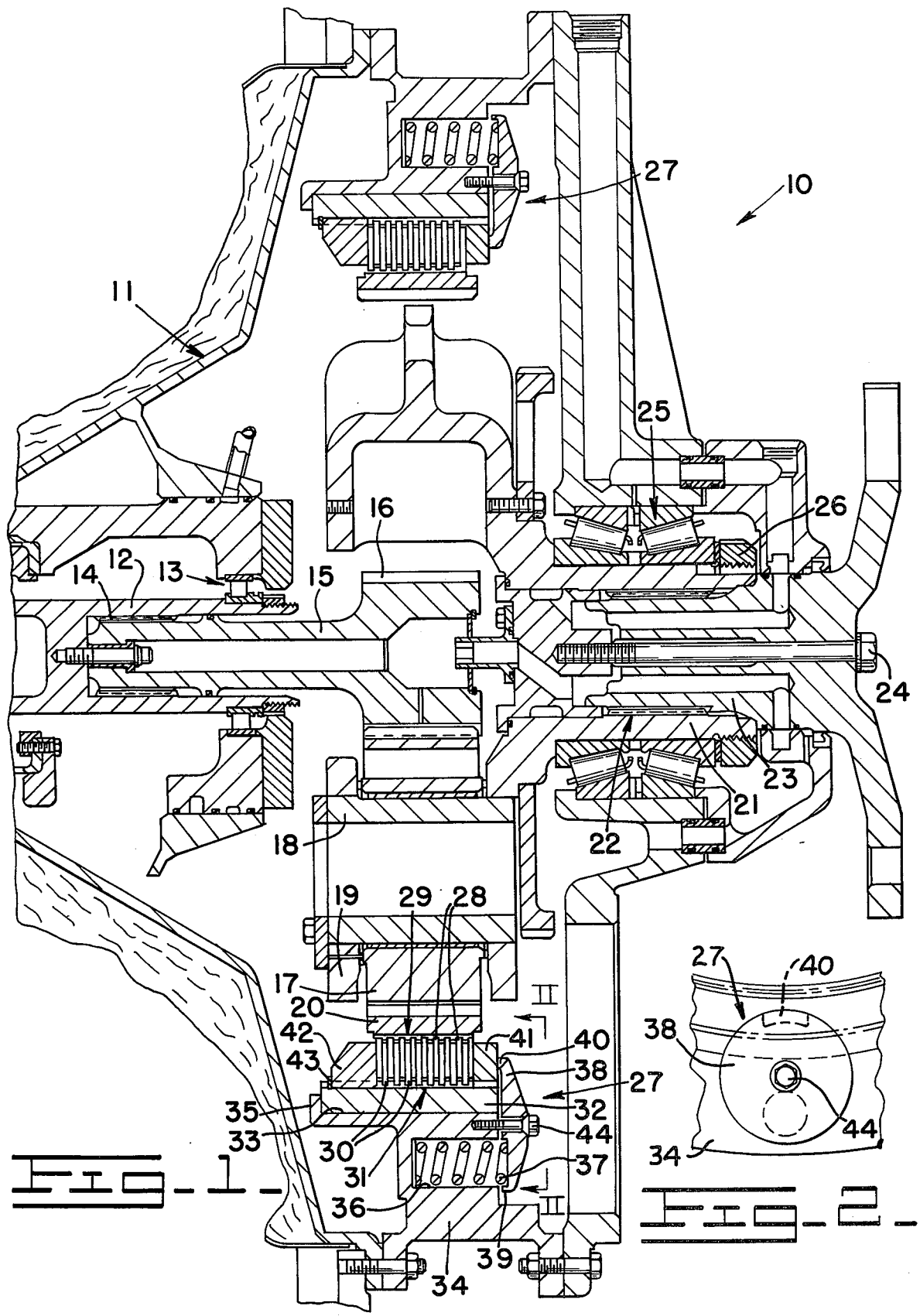

OVERLOAD SAFETY DEVICE FOR GAS TURBINE ENGINES

BACKGROUND OF THE INVENTION

This invention relates to an improved overload safety device particularly useful in high speed gas turbine engines to protect the output gears and shaft system thereof against damage due to instantaneous loads being imposed on the turbine, such as the turbine-driven generator.

High speed gas turbine engines are prone to damage when very high instantaneous loads are applied to the output shaft thereof during operation. A good example of such instantaneous loads are out-of-phase paralleling of a turbine-driven generator which can cause loads in the order of 10 to 15 times rated torque, which high torque loads would likely cause severe damage to the turbine output gears and shaft system.

SUMMARY OF THIS INVENTION

The present invention is principally directed to a safety device particularly useful in the drive train between the turbine and the accessory, so that whenever a severe overload occurs, the above-mentioned torque loads are not transmitted to the turbine engine output gears and shaft system. This invention has the capability of being set to allow normal positive torque to be transmitted between the drive and driven gear shafts in a gear box at or below a predetermined torque load, to disengage the positive torque transmission when the predetermined torque load is exceeded and to re-engage again when the high torque load ceases.

Specifically, the aforementioned problem of damage to the high speed turbine engine is solved by this invention by providing a turbine engine output gear box of the planetary gear type, connected to the turbine driven accessory via a spring loaded broke pack. The broke pack normally couples a ring gear to a stationary housing under a predetermined amount of clamping force so as to regulate slipping torque to approximately twice the rated torque of the gear box. The brake pack will slip when an overload is imposed on the gear train and allow the ring gear to rotate until the overload ceases whereupon the accessory will then continue operation.

BRIEF DESCRIPTION OF THE DRAWING

Other objects of this invention will become apparent from the following description and accompanying drawing wherein:

FIG. 1 is a partially broken-away, cross sectional view of a turbine engine output gear box embodying the overload safety device of the present invention; and FIG. 2 is a view taken in the direction of arrows II—II in FIG. 1.

DETAILED DESCRIPTION

In the drawing, a turbine output gear box 10 comprises a multi-part housing 11 having an input drive shaft 12 connected to a turbine engine (not shown) and journalled in suitable bearings 13. The drive shaft is internally splined at 14 to receive a coaxially disposed and externally splined shaft 15 having a sun gear 16 secured on the opposite end thereof. The sun gear meshes in a conventional manner with a plurality of planetary gears 17 (one shown) for rotating about the sun gear and on hub members 18 (one shown). The hub members are mounted on a carrier 19 and the planetary gears mesh internally with a normally fixed ring gear 20 whereby rotation of the planetary gears within the ring gear will transmit rotational movement to the carrier in the conventional manner.

A hub 21 of carrier 19 is internally splined at 22 to receive an externally splined output shaft 23 in driving relationship and is mounted in coaxial relationship relative to input shaft 12. The output shaft may be connected to the carrier in any suitable manner, as by a bolt 24, and operates in unison therewith. Hub 21 is shown extending through an extension on carrier 19 and journalled in suitable bearings, such as roller bearings 25, on the external surface of the hub in a conventional manner by a threaded ring 26.

As aforementioned, ring gear 20 is described as being normally stationary since the gear box operating under or at a rated torque will be operatively fixed to housing 11 so that input shaft 12 normally transmits torque to output shaft 23. In particular, an overload safety device 27 will normally hold the ring gear stationary until a torque of a predetermined amount is exceeded, at which time the device will release to allow the ring gear to freely rotate or slip. When such excessive torque ceases, the safety device will automatically return the ring gear to its stationary position relative to the housing.

Safety device 27 comprises a first plurality of friction discs 28 splined at 29 to the outer periphery of ring gear 20. The friction discs are interleaved with a second plurality of friction discs 30, splined at 31 to a stationary ring 32, to form a normally "on" brake or drive establishing means. The ring, nested in a platform 33 formed on a mid-portion 34 of multi-part housing 11, extends radially inwardly and has an annular rim 35 formed thereon which functions as a stop means to hold one edge of ring 32 against lateral movement.

Housing portion 34 is formed with a plurality of blind bores 36 (two shown), each of which accommodates a coil compression spring 37 which is seated against the base of the blind bore and reacts against a clamping bar 38 forming a first class lever. The clamping bar is provided with a pair of lips 39 and 40 on either end thereof. Lip 39 serves to space the end of the clamping bar engaged by spring 37 from the opposed sidewall of housing portion 34 to permit limited pivoting of the clamping bar. Lip 40 engages an annular pressure plate 41 mounted for limited axial movement on ring 32.

An annular backup plate 42 is anchored on ring 32 by a snap ring 43. A ball head bolt 44 pivotally mounts clamping bar 38 on housing section 34. The bolt and spring 37 thus serve to adjust the total amount of the friction between friction discs or drive establishing means 28 and 30 to thus regulate the slipping torque of safety device 27.

From the foregoing, it can be seen that safety device 27 will normally hold ring gear 20 fixed relative to the stationary housing. The device also serves as a means for limiting the torque transmitted between input and output shafts 12 and 23 by permitting the ring gear to slip and rotate, in the event that the torque on the ring gear exceeds the amount determined by compression coil springs 37. Normally, the slipping torque for the friction discs is set at twice the rate of torque for the gear box so that when this amount of torque is exceeded, the ring gear is permitted to slip until the excessive load on the gear box ceases whereupon the safety device will again hold the ring gear fixed for normal operation of the gear box. Finally, while only two safety devices 27 are shown, any desired number thereof can be placed in the gear box and suitably calibrated depending upon the total amount of slipping torque desired.

We claim:

1. A drive mechanism mounted in a stationary housing comprising an input shaft rotatably mounted in said housing, an output shaft rotatably mounted in said housing, drive means, including normally engaged drive establishing means, interconnecting said input shaft and said output shaft for normally permitting said input shaft to continuously rotate said output shaft under varying torque loads, and an overload safety device including clamping bar means pivotally mounted in said mechanism adjacent to said drive establishing means for normally permitting engagement of said drive establishing means and for releasing said drive establishing means when said torque loads exceed a predetermined amount.

2. The drive mechanism of claim 1 wherein said drive means comprises intermeshing first and second gear means and wherein said drive establishing means is normally connected to said second gear means and releasable therefrom by said overload safety device.

3. The drive mechanism of claim 2 wherein said second gear means is normally held against rotation relative to said housing by said drive establishing means and by said overload safety device.

4. The drive mechanism of claim 3 wherein said second gear means comprises a ring gear.

5. The drive mechanism of claim 4 wherein said first gear means comprising a plurality of planetary gears meshing with said ring gear.

6. The drive mechanism of claim 3 wherein said drive establishing means comprises a plurality of first friction discs splined to said second gear means and a plurality of second friction discs splined to said housing and interleaved with respect to said first friction discs, said clamping bar means normally compressing said first and second friction discs together under a predetermined force to hold said second gear means against rotation relative to said housing.

7. The drive mechanism of claim 6 wherein said overload safety device further comprises a pressure plate mounted for axial movement on said housing and positioned adjacent to said first and second friction discs and wherein said clamping bar means engages said pressure plate for normally urging it against said first and second friction discs to compress them together.

8. The drive mechanism of claim 7 wherein said clamping bar means comprises at least one clamping bar pivotally mounted on said housing between first and second ends thereof to form a first class lever arrangement.

9. The drive mechanism of claim 8 wherein said clamping bar means further comprises spring means disposed between said housing and the first end of said clamping bar for urging the second end thereof into engagement with said pressure plate.

10. The drive mechanism of claim 9 wherein said clamping bar is pivotally mounted on said housing by a ball head bolt.

11. The drive mechanism of claim 1 wherein said drive means further comprises a planetary gear set including a sun gear attached to said input shaft for rotation therewith, an internal ring gear and a plurality of planet gears rotatably mounted on a carrier attached to said output shaft for rotation therewith, said planetary gears intermeshed between said sun gear and said ring gear.

12. The drive mechanism of claim 11 wherein said drive establishing means comprises a plurality of first friction discs splined externally on said ring gear and a plurality of second friction discs splined internally on said housing and interleaved with respect to said first friction discs to form a brake for normally holding said ring gear against rotation relative to said housing upon compression of said first and second friction discs together by said clamping bar means.

13. The drive mechanism of claim 12 wherein said drive mechanism constitutes a turbine output planetary gear box.

14. A drive mechanism comprising an input shaft, an output shaft, drive means, including normally engaged drive establishing means comprising first and second sets of interleaved friction discs, interconnecting said input shaft and said output shaft for normally permitting said input shaft to drive said output shaft under varying torque loads, and an overload safety device including clamping bar means pivotally mounted in said mechanism adjacent to said drive establishing means for normally permitting engagement of the first and second sets of friction discs of said drive establishing means by applying pressure thereto and for releasing said first set of friction discs from said second set of friction discs when said torque loads exceed a predetermined amount.

15. A drive mechanism mounted in a stationary housing comprising an input shaft, an output shaft, drive means, including normally engaged drive establishing means, interconnecting said input shaft and said output shaft for normally permitting said input shaft to drive said output shaft under varying torque loads, and an overload safety device including clamping bar means pivotally mounted in said mechanism adjacent to said drive establishing means for normally permitting engagement of said drive establishing means and for releasing said drive establishing means when said torque loads exceed a predetermined amount, said drive means further comprising intermeshing first and second gear means and wherein said drive establishing means comprises a plurality of first friction discs splined to said second gear means and a plurality of second friction discs splined to said housing and interleaved with respect to said first friction discs, said clamping bar means normally compressing said first and second friction discs together under a predetermined force to hold said second gear means against rotation relative to said housing.

16. A drive mechanism comprising an input shaft, an output shaft, a stationary housing, drive means, including normally engaged drive establishing means, mounted in said housing and interconnecting said input shaft and said output shaft for normally permitting said input shaft to drive said output shaft under varying torque loads, said drive means further including a planetary gear set including a sun gear attached to said input shaft for rotation therewith, an internal ring gear and a plurality of planet gears rotatably mounted on a carrier attached to said output shaft for rotation therewith, said planetary gears intermeshed between said sun gear and said ring gear, and an overload safety device including clamping bar means pivotally mounted in said mechanism adjacent to said drive establishing means for normally permitting engagement of said drive establishing means and for releasing said drive establishing means when said torque loads exceed a predetermined amount.

* * * * *